United States Patent [19]

Dür et al.

[11] 4,068,906

[45] Jan. 17, 1978

[54] SYSTEM FOR SECURING GUIDE RAILS IN MACHINE STAND

[75] Inventors: Werner Dür, St. Margrethen; René Forster, Amriswil, both of Switzerland

[73] Assignee: Hydrel A.G., Romanshorn, Switzerland

[21] Appl. No.: 663,811

[22] Filed: Mar. 4, 1976

[30] Foreign Application Priority Data

Nov. 26, 1975 Switzerland .................. 15310/75

[51] Int. Cl.² ............................................ F16C 29/00
[52] U.S. Cl. ................................ 308/3 A; 29/450; 29/149.5 R; 403/381
[58] Field of Search ....... 29/450, 149.5 NM, 149.5 R; 52/753 D, 758 D; 308/3 A, 3 R; 403/381, 368, 372

[56] References Cited

U.S. PATENT DOCUMENTS

| 1,107,477 | 8/1914 | Bartels | 403/381 |
| 1,285,628 | 11/1918 | Craley | 403/381 X |
| 3,053,580 | 9/1962 | Bullard et al. | 308/3 A |
| 3,115,696 | 12/1963 | Evans | 29/149.5 NM |
| 3,438,660 | 4/1969 | Steiner | 430/368 X |
| 3,577,316 | 5/1971 | Piette | 403/381 X |
| 3,776,653 | 12/1973 | Buzogany | 403/372 |

FOREIGN PATENT DOCUMENTS 345,380 3/1931 United Kingdom .............. 308/3 A

Primary Examiner—Charlie T. Moon
Attorney, Agent, or Firm—Karl F. Ross

[57] ABSTRACT

A machine stand having a planar surface is formed with a groove of predetermined width. A precision guide rail slightly narrower than the groove is received in this groove and has an edge confronting and spaced from one of the flanks of the groove. A corrugated spring steel holding element is compressed between the edge of the rail and the flank of the groove and has corrugations extending transverse to the plane of the machine stand.

4 Claims, 3 Drawing Figures

SYSTEM FOR SECURING GUIDE RAILS IN MACHINE STAND

1. Field of the Invention

The present invention relates to a machine stand. More particularly this invention concerns the mounting of a gib or precision guide rail in the groove of a machine stand.

2. Background of the Invention

A gib or guide rail is most commonly secured by screws to its groove in a machine bed or stand. Such screw connection frequently deforms the precision guide rail. Furthermore the drilling and threading of the necessary holes as well as proper screwing-down of the rail considerably increases the cost of the set up.

It is also known to adhesively secure the gib or guide rail to the machine stand. Such an arrangement has the disadvantage that with age the adhesive loosens so that periodically the rail must be removed, cleaned, and reglued in place. In addition it is necessary that the rail be glued with extreme care so that setting up such a machine bed is an expensive operation.

It has further been suggested to wedge the guide rail in place by means of a longitudinally elongated profiled or grooved bar whose profile shape or edges extend parallel to the longitudinal axis of the guide rail. For such a system it is usually necessary to machine a groove of odd cross-sectional shape in the machine stand so that the installation cost is again elevated.

An attempt to overcome this last-given disadvantage has been made by means of resilient wedging elements, as in the form of synthetic-resin strips that are hammered into place next to the bar in the groove. Such an arrangement has the disadvantage that many common chemical substances such as acetone or trichloroethylene, as well as the aromatic components of various lubricants dissolve the plastic and therefore loosen the rail. Furthermore as the synthetic-resin wedging element ages it tends to loosen in the groove.

OBJECTS OF THE INVENTION

It is therefore an object of the present invention to provide an improved mounting method and arrangement for a gib or guide rail in a groove of a machine stand.

Another object is the provision of an improved system for mounting a guide rail in a machine stand which overcomes the above-given disadvantages, by being inexpensive to install and having a long service life.

SUMMARY OF THE INVENTION

These objects are attained according to the present invention by driving in next to the precision guide rail a resilient longitudinally elongated holding element that is compressed transversely in the space between the edge and the flank of the groove and which has a succession of parallel corrugations which extend transverse to the surface of the machine stand. Thus the edge of the guide rail and the corresponding flank of the groove are urged apart with pressure being exerted against them along lines extending parallel to one another and transverse to the plane of the machine stand.

With this system extremely high clamping force is obtained even though the spring-steel holding element only engages between the narrow side of the guide rail and the corresponding flank of the groove receiving the rail. Such one-sided clamping of the guide rail greatly decreases mounting cost and complexity. Furthermore such an arrangement is completely insensitive to longitudinal elongated of the guide rail due, for instance, to thermal expansion. The spring-steel band has a service life that is at least as long as that of the machine so long as its elastic limit is not exceeded. Furthermore it is not sensitive, like synthetic-resin clamping elements, to extremes of heat or common chemicals.

According to further features of this invention the edge of the guide rail and the confronting flank of the groove are parallel to each other. They extend either perpendicular to the surface of the machine stand, or at a slight angel threto when, for instance, a dovetail rail is employed.

SPECIFIC DESCRIPTION

Figure 1:
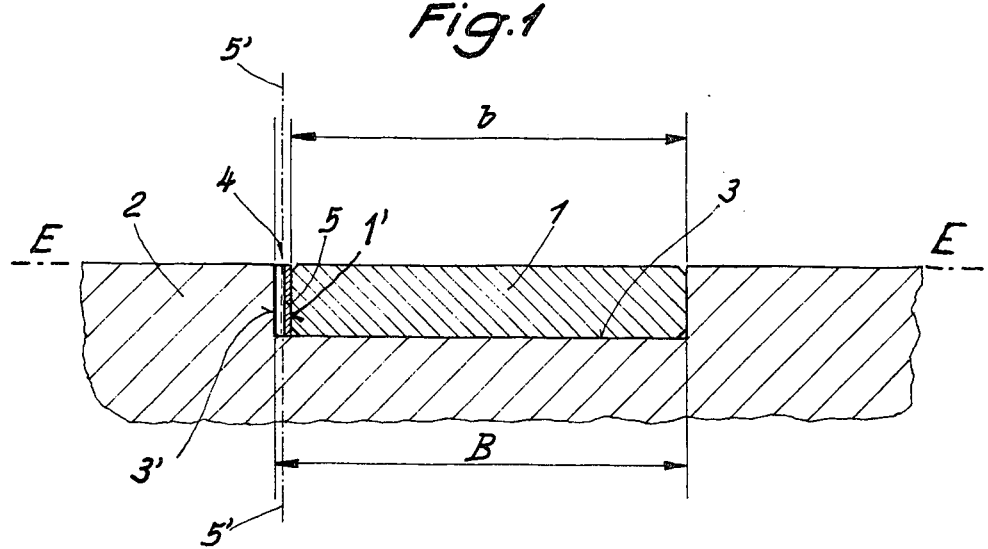
FIG. 1 is a vertical section through the arrangement according to this invention.
Figure 2:
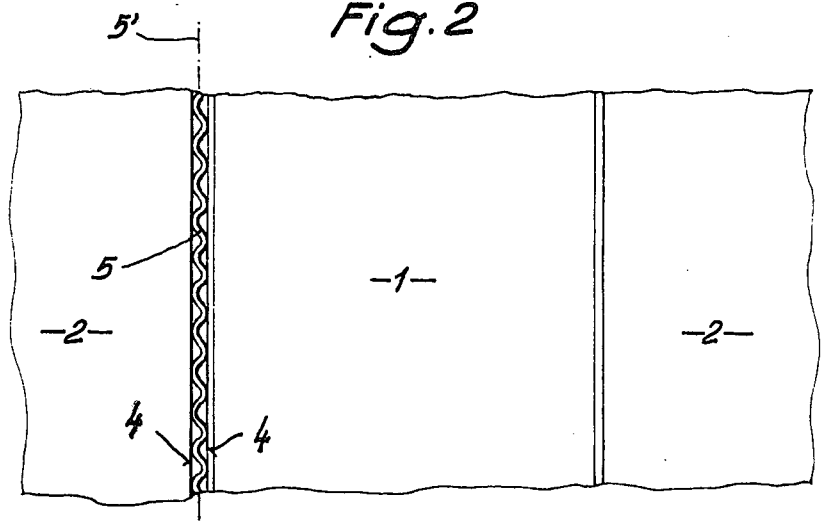
FIG. 2 is a top view of the arrangement of FIG. 1.

The arrangement shown in FIGS. 1 and 2 has a rectangular-section precision steel guide rail 1 set in a groove 3 formed in a machine stand 2. The upper surface of the machine stand 2 and the bar 1 form a plane E and the groove 3 has a transverse width B slightly larger than the corresponding transverse width $b$ of the bar 1.

The bar 1 has a planar edge surface 1' confronting a planar flank 3' of the groove 3 and forming a space 4 therewith. This space 4 has a transverse width equal to the difference between widths B and $b$. A spring-steel corrugated band 5 is compressed between the surfaces 1' and 3' in the space 4. The corrugations of this band extend perpendicular to the plane E and are centered on axes lying in a plane 5' perpendicular to this plane E. Thus the corrugated band 5 presses against the surfaces 1' and 3' at lines perpendicular to the plane E. Another such band 5 can be provided on the opposite side of the gib 1.

Figure 3:
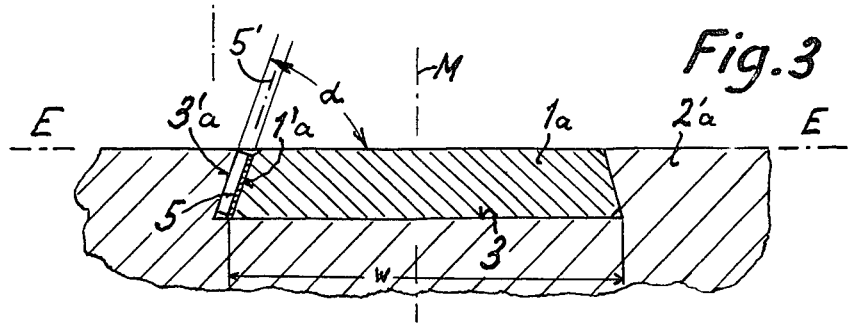
FIG. 3 is a view similar to FIG. 1 showing another arrangement in accordance with this invention.

The arrangement shown in FIG. 3 is substantially identical to that shown in FIGS. 1 and 2 except that here the machine bed 2a is formed with a dovetail-section groove 3a receiving a dovetail-section rail 1a having an edge surface 1a' confronting the edge surface 3a. The band 5 is identical to that of FIGS. 1 and 2 is received between the two but here the plane 5' extends at an acute angle $\alpha$ of 75° to the plane E. The dovetail-section rail 1a is asymmetrical about a middle plane M perpendicular to the plane E and has at its base a width W which is slightly smaller than the width of the groove 3a at its mouth, so that the rail 1a can be dropped into this groove 3a and then the spring 5 hammered in place to secure it there. Preferably the crest spacing (wavelength) S of the corrugations is greater than the gap width $s$ with best results being obtained with $0.25\,S \leq s \leq S$ or $s \approx 0.5\,S$.

We claim:

1. An assembly comprising a machine stand having an elongated body formed with a shallow groove opening at a planar surface, said groove extending along said body and having a pair of longitudinally extending flanks;

a precision guide rail of a thickness equal to the depth of said groove and received therein, said guide rail extending substantially over the length of said groove and having a face flush with said surface, said guide rail having a width less than the distance between said flanks and having a side defining with one of said flanks a longitudinally extending space while bearing on the other of said flanks; and an elongated spring-steel strip received in said space and compressed against said one of said flanks and said side of said rail, said strip having a width equal to that of said side and further having a succession of parallel corrugations whose trough and crest axes extend transversely to said surface and said face, said troughs alternately and directly engaging said one of said flanks and said side.

2. The assembly defined in claim 1 wherein said axes extend perpendicularly to said surface and said face and said one flank, parallel to an edge of said rail, said one flank and said edge being perpendicular to said surface and said face.

3. The assembly defined in claim 1 wherein said axes lie at an angle to said surface and said face and said one of said flanks is parallel to an edge of said rail, said edge and said one of said faces being inclined at said angle to said surface and said face.

4. An assembly defined in claim 3 wherein said groove and said rail are of dovetailed cross section.

* * * * *